United States Patent

[11] 3,622,564

| [72] | Inventors | Edmund T. Kittleman;<br>Roy A. Gray, both of Bartlesville, Okla. |
|---|---|---|
| [21] | Appl. No. | 788,950 |
| [22] | Filed | Jan. 3, 1969 |
| [45] | Patented | Nov. 23, 1971 |
| [73] | Assignee | Phillips Petroleum Company |

[54] SYNTHESIS OF GLYCOSE HYDROCARBON SULFONATE SURFACTANTS
11 Claims, No Drawings

| [52] | U.S. Cl. | 260/234 R, 252/353 |
|---|---|---|
| [51] | Int. Cl. | C07c 69/32 |
| [50] | Field of Search | 260/234, 234 R |

[56] References Cited
UNITED STATES PATENTS

| 3,057,855 | 10/1962 | Smith et al. | 260/234 |
| 3,070,595 | 12/1962 | Petracek et al. | 260/234 |
| 2,786,833 | 3/1957 | Wurzburg et al. | 260/234 |

Primary Examiner—Lewis Gotts
Assistant Examiner—Johnnie R. Brown
Attorney—Pendleton, Neuman, Williams & Anderson ABSTRACT: Glycose hydrocarbonsulfonates useful as surfactants are prepared by reacting a glycose with a hydrocarbonsulfonyl halide in the presence of a tertiary amine.

SYNTHESIS OF GLYCOSE HYDROCARBON SULFONATE SURFACTANTS

This invention relates to the synthesis of glycose hydrocarbonsulfonates which are useful as surfactants.

The copending Pat. application, Ser. No. 788,958 filed Jan. 3, 1969 by Roy A. Gray, Edmund T. Kittleman and Gardner C. Ray, discloses novel glycose hydrocarbonsulfonates which possess surface active properties rendering them useful in detergent and other applications. As disclosed in that application, the glycose hydrocarbonsulfonates are prepared in two steps; in step one, an alkali metal salt of a glycose is formed and then in step two the alkali metal glycate is reacted with a hydrocarbonsulfonyl halide to form a desired glycose hydrocarbonsulfonate.

We have found that glycoses can be reacted directly with hydrocarbonsulfonyl halides to form the glycose hydrocarbonsulfonates without the necessity of first forming an alkali metal glycate. This discovery, forming the basis of this invention, affords numerous advantages among which can be mentioned: fewer process steps, reduction in equipment and reduction in reactant costs.

The improved process of the invention comprises reacting a glycose with a hydrocarbonsulfonyl halide in the presence of a tertiary amine.

The process of the present invention can be represented as follows:

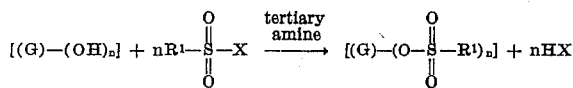

wherein
X is chlorine, bromine or iodine,
n is an integer of from one to 12 inclusive, preferably one to six inclusive, and
$R^1$ is alkyl or cycloalkyl having from about six to 25 carbon atoms inclusive, preferably 12 to 18 carbon atoms inclusive, such as hexyl, octyl, isooctyl, pentacosyl, decyl, dodecyl, tetradecyl, hexadecyl, cyclododecyl, octadecyl, nonadecyl, cyclohexyl, cycloheptyl, cyclooctyl, cyclopentacosyl, cyclooctadecyl, cyclononyl, cyclodecyl and the like.

The representation $[(G)-(OH)_n]$ represents a glycose molecule and the $(OH)_n$ groups thereof can be any of the active hydroxyl groups in the molecule.

The preferred hydrocarbonsulfonyl halides to employ in the process of this invention are straight chain 1-alkanesulfonyl halides in which the alkane moiety contains from 12 to 18 carbon atoms inclusive.

The tertiary amine employed in the synthesis method of this invention can be any amine wherein nitrogen is bonded to three carbon atoms and containing from three to 12 carbon atoms inclusive. The amines can contain one or more nitrogen atoms. Representative amines which can be employed thus include trimethylamine, tri-n-butylamine, triethylamine, N-methylpiperidine, N,N,N',N'-tetramethylethylenediamine, N,N'-diethylpiperazine, and the like.

The process of this invention is conducted by mixing a glycose with a hydrocarbonsulfonyl halide at a temperature in the range of about −10° to 25° C. under pressure sufficient to maintain the reactants substantially completely in the liquid phase. The reaction is preferably accomplished under substantially anhydrous conditions. Moreover, if desired, suitable diluents can be employed in amounts as high as 95 weight percent of the reaction medium. Examples of suitable diluents include N,N-dimethylformamide, N,N-diethylacetamide, tetrahydrofuran, tetrahydropyran, N-methylpyrrolidone, and the like. The diluent employed should be substantially nonreactive under the reaction environment. The reaction is generally complete in periods ranging from about 5 minutes to about 48 hours.

It is essential to the process of this invention that a tertiary amine be present. The tertiary amines are preferably employed in amounts of about 0.1 to 10 moles per mole of glycose present, inclusive.

The hydrocarbonsulfonyl halides which are employed according to this invention can be synthesized by any convenient means. For example, such compounds can be prepared in accordance with the teachings of U.S. Pat. No. 3,238,255 which relates to sulfochlorination of hydrocarbons. Likewise, a terminal olefin of suitable nature can be reacted with thiolacetic acid followed by hydrolysis to yield the respective terminal thiol which can subsequently be halogenated in the presence of water to yield the 1-alkanesulfonyl halide desired. Suitable means of effecting these syntheses are disclosed by L. Bateman et al., *J. Chem. Soc.*, 2838 (1958) and Douglass and Johnson, *J. Am. Chem. Soc.*, 60, 1486 (1938). In the practice of the process of the invention the hydrocarbonsulfonyl halides are generally employed in amounts of from about 0.1 to about 10 moles per mole of glycose.

The glycoses which can be employed in accordance with this invention include mono and polysaccharides, having in the range of 1 to about 5 monosaccharide units. Each saccharide unit can contain in the range of about four to about seven carbon atoms, and can be either an aldose or a ketose unit. Representative examples of suitable glycoses are sucrose, fructose, sorbose, glucose, maltose, mannose, galactose, threose, xylose, arabinulose, lactose, raffinose, stachyose, and the like. Glycoses of this group which are nonreducing sugars are preferred and nonreducing disaccharides, such as sucrose, are particularly preferred.

The invention is further illustrated by the following examples.

EXAMPLE I

Hexadecane is sulfochlorinated with chlorine and sulfur dioxide, promoted by ultraviolet light, according to the process of U.S. Pat. No. 3,238,255. The resultant product, which is separated by fractional crystallization, is found to be comprised largely of hexadecanesulfonyl chloride.

A 100 milliliter quantity of 0.5 M sucrose in dimethylformamide (50 moles of sucrose) is charged to a stirred reactor with 2.8 milliliters (20 moles) of triethylamine. A total of 10 moles of hexadecanesulfonyl chloride, prepared as above, is then slowly added over a period of about 45 minutes. The mixture is cooled to about −10° to 0° C. for 60 additional minutes. The reaction mixture is then added to 210 milliliters of toluene. Unreacted sucrose and triethylamine hydrochloride precipitates, the mixture is filtered, and the filtrate added to 128 milliliters of heptane. A lower phase of about 20 milliliters separates, and is taken up in a solution comprised of 1:2 methanol:isopropanol (v/v). The upper phase is further diluted with 282 milliliters of heptane, and the bottom phase which separates is taken up in 100 milliliters of methanol. The two alcoholic extracts are combined and stripped to a colorless oil. The residual oil is mixed with 500 milliliters of heptane and 100 milliliters of chloroform. Upon vigorous agitation, a precipitate forms. The precipitate is separated and dissolved in a mixture comprised of chloroform and heptane in a 2:1 v/v ratio. The residue is dried in vacuo over $P_2O_5$. The resulting sucrose hexadecanesulfonate product weighs 5.8 grams. Elemental composition for sucrose hexadecanesulfonate is calculated to be: C, 53.3 percent; H, 8.6 percent; S, 5.1 percent. Elemental composition of the sucrose hexadecanesulfonate product formed is determined to be: C, 48.6 percent; H, 7.9 percent; S, 4.2 percent.

EXAMPLE II

Following the procedure of example I, mannose is reacted, in the presence of N-methylpiperidine, with nonanesulfonyl chloride to form as product, mannose nonanesulfonate.

EXAMPLE III

Following the procedure of example I, maltose is reacted, in the presence of N,N'-diethylpiperazine (0.5 mole per mole of maltose), with tridecanesulfonyl bromide to form as product, maltose tridecanesulfonate.

EXAMPLE IV

A. 1-Dodecanethiol is prepared by a method employed by L. Bateman et al., *J. Chem. Soc.*, 2838 (1958) [cf. Brown et al., ibid., 2123 (1951)], the reaction being represented as follows:

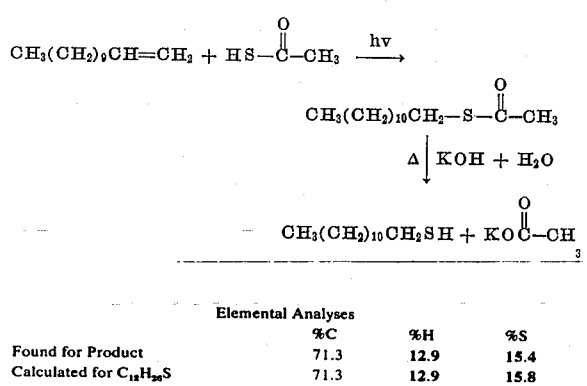

| | Elemental Analyses | | |
|---|---|---|---|
| | %C | %H | %S |
| Found for Product | 71.3 | 12.9 | 15.4 |
| Calculated for $C_{12}H_{26}S$ | 71.3 | 12.9 | 15.8 |

B. The 1-dodecanethiol is then converted to the respective alkanesulfonyl chloride by the method of Douglass and Johnson, *J. Am. Chem. Soc.*, 60, 1486 (1938), the reaction being represented as follows:

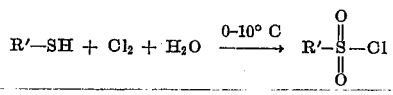

wherein R' represents the dodecyl group.

EXAMPLE V

Following the procedures of example IV, the following alkanesulfonyl chlorides are synthesized:
1-dodecanesulfonyl chloride
1-tetradecanesulfonyl chloride
7-tetradecanesulfonyl chloride
1-hexadecanesulfonyl chloride
1-octadecanesulfonyl chloride.

EXAMPLE VI

A 100 milliliter portion of 0.5 M sucrose in dimethylformamide (50 moles of sucrose) is charged to a stirred reactor with 2 grams (20 moles) of triethylamine. Upon cooling of the reactor contents to about −10° C., a solution comprised of 3.25 grams (10 moles) of 1-tetradecanesulfonyl chloride (prepared as in example V) in 25 milliliters of toluene is slowly added over a 50 minute period. Stirring is continued at about −10° C. for an additional 60 minutes. The reaction mixture is then diluted with 185 milliliters of toluene to precipitate sucrose and triethylamine hydrochloride. The supernatant liquid is separated and subsequently diluted with 1140 milliliters of n-heptane. Phases form. The lower phase is separated and stripped of volatiles to leave an oil. This oil is contacted with a mixture comprised of 200 milliliters of n-heptane and 40 milliliters chloroform. An amorphous solid precipitates. The supernatant liquid is decanted, and the residue is stripped of volatiles to leave an amorphous solid prior in drying in vacuo over $P_2O_5$ to give 6.4 grams of sucrose 1-tetradecanesulfonate product. Elemental composition of this product is determined and found to be in agreement with the elemental composition calculated for a sucrose 1-tetradecanesulfonate thus:

| | %C | %H | %S |
|---|---|---|---|
| Found | 49.2 | 8.1 | 4.2 |
| Calculated | 51.8 | 8.3 | 90 5.3 |

EXAMPLE VII

Following the procedure of example VI, sucrose is reacted with 1-dodecanesulfonyl chloride prepared as in example IV. The resulting product, sucrose 1-dodecanesulfonate, has elemental analyses as follows:

| | Elemental Analyses | | |
|---|---|---|---|
| | %C | %H | %S |
| Found | 48.6 | 7.9 | 4.5 |
| Calculated | 50.2 | 8.0 | 5.6 |

EXAMPLE VIII

In a manner similar to example VI, sucrose is reacted with 1-hexadecanesulfonyl chloride prepared as in example V. The resulting product, sucrose 1-hexadecanesulfonate, has elemental analyses as follows:

| | Elemental Analyses | | |
|---|---|---|---|
| | %C | %H | %S |
| Found | 52.0 | 8.7 | 4.5 |
| Calculated | 53.3 | 8.7 | 5.1 |

EXAMPLE IX

In a manner similar to example VI, sucrose is reacted with 7-tetradecanesulfonyl chloride prepared as in example V. The resulting product, sucrose 7-tetradecanesulfonate, has elemental analyses as follows:

| | Elemental Analyses | | |
|---|---|---|---|
| | %C | %H | %S |
| Found | 51.4 | 8.5 | 4.4 |
| Calculated | 51.8 | 8.3 | 5.3 |

EXAMPLE X

In a manner similar to example VI, sucrose is reacted with 1-octadecanesulfonyl chloride prepared as in example V. The resulting product, sucrose 1-octadecanesulfonate, has elemental analyses as follows:

| | Elemental Analyses | | |
|---|---|---|---|
| | %C | %H | %S |
| Found | 50.9 | 8.3 | 3.7 |
| Calculated | 54.6 | 8.8 | 4.9 |

The glycose hydrocarbonsulfonates produced in accordance with this invention are surfactants useful as detergents. Representative glycose sulfonates produced by the process of this invention were evaluated as detergents by washing standard soiled cotton cloth (UST is U.S. Testing Company cloth; TF is Testfabric Company cloth) in a Tergotometer and then measuring the difference in light reflectance between washed and unwashed cloth by means of a MultiPurpose Reflectometer. The detergency ratings which follow in table 1 are defined by the relationship: $(IR)_A − (IR)_B$ wherein $(IR)_A$ represents the increase in reflectance obtained in the presence of the active detergent species plus test additives (defined below) and $(IR)_B$ denotes increase in reflectance effected by the additives alone. For example, formulations were prepared by dissolving 0.6 gram active ingredient and 2.4 grams test additives (stock solution aliquot) in sufficient water to give 2 liters of solution. In table 1, below, the detergency rating at this concentration level is indicated in the 0.15 percent column $$\left[\frac{0.6+2.4}{2000} \times 100\right]$$

results based on lower concentration levels are listed in the columns labeled 0.10 percent and 0.05 percent, and are determined in an analogous manner. Test additives which constituted 80 percent of the formulation consisted of sodium tripolyphosphate (50 percent), sodium sulfate (15 percent), sodium metasilicate (5 percent), carboxymethyl cellulose (0.8 percent) and water (9.2 percent) by weight. The other 20 percent by weight of the formulation was in each case made up of the active ingredient, i.e., the prospective surfactant to be tested. $(IR)_s$ values for UST and TF cloths at concentrations of 0.15 percent, 0.10 percent and 0.05 percent were, respectively: 8.2, 10.2; 7.4, 9.6; and 7.4, 9.6.

TABLE 1

| Surfactant | 0.15% | | 0.10% | | 0.05% | |
|---|---|---|---|---|---|---|
| | UST | TF | UST | TF | UST | TF |
| Sucrose 1-tetradecanesulfonates | 4.5 | 3.9 | 5.6 | 3.8 | 4.4 | 4.3 |
| Sucrose 7-tetradecanesulfonates | 3.3 | 3.0 | 1.8 | 2.7 | 0.3 | 1.5 |
| Sucrose 1-hexadecanesulfonates | 5.7 | 3.7 | 5.1 | 4.8 | 4.6 | 3.2 |
| Sucrose 1-dodecanesulfonates | 4.1 | 3.1 | 4.0 | 3.2 | 1.4 | 2.5 |
| Sucrose 1-octadecanesulfonates | 4.6 | 4.0 | 4.7 | 3.8 | 3.7 | 2.8 |

The data of table 1 show that the glycose hydrocarbonsulfonates produced by the process of this invention are useful as surfactants in detergents. The glycose sulfonates are biodegradable under both aerobic and anaerobic conditions.

Those modifications and equivalents which fall within the spirit of the invention are to be considered a part thereof.

We claim:

1. A process for producing glycose hydrocarbonsulfonates which comprises reacting a glycose with a hydrocarbonsulfonyl halide, the reaction being carried out under substantially anhydrous conditions at a temperature not substantially in excess of 25° C. in the presence of an amine containing from three to 12 carbon atoms in the molecule and wherein the nitrogen is bonded to three carbon atoms.

2. The process of claim 1 carried out at a temperature in the range of from −10° to 25° C.

3. The process of claim 1 carried out in the presence of a nonreactive diluent.

4. The process of claim 1 wherein there is employed a hydrocarbonsulfonyl halide wherein the hydrocarbon moiety is an alkyl or cycloalkyl radical containing from six to 25 carbon atoms.

5. The process of claim 1 wherein there is employed a hydrocarbonsulfonyl halide wherein the hydrocarbon moiety is an alkyl or cycloalkyl radical containing from 12 to 18 carbon atoms.

6. The process of claim 1 wherein there is employed a hydrocarbonsulfonyl halide wherein the hydrocarbon moiety is a straight chain alkyl radical containing from 12 to 18 carbon atoms.

7. The process of claim 1 wherein the hydrocarbonsulfonate employed is a 1-alkanesulfonyl halide with the alkane moiety containing from 12 to 18 carbon atoms.

8. The process of claim 1 wherein a nonreducing glycose is employed.

9. The process of claim 1 wherein the glycose employed is sucrose.

10. A process in accordance with claim 7 wherein a nonreducing glycose is employed.

11. A process in accordance with claim 7 wherein the glycose employed is sucrose.

UNITED STATES PATENT OFFICE
CERTIFICATE OF CORRECTION

Patent No. 3,622,564                Dated November 23, 1971

Inventor(s) Edmund T. Kittleman and Roy A. Gray

It is certified that error appears in the above-identified patent and that said Letters Patent are hereby corrected as shown below:

Column 2, line 39, "moles" should be -- mmoles -- line 40, "moles", both occurrences, should be -- mmoles --

Column 3, line 50, "moles" should be -- mmoles -- line 51, "moles" should be -- mmoles -- line 54, "moles" should be -- mmoles -- line 67, "in", first occurrence, should be -- to -- line 75, "905.3" should be -- 5.3 --

Signed and sealed this 16th day of May 1972.

(SEAL)
Attest:

EDWARD M. FLETCHER, JR.                ROBERT GOTTSCHALK
Attesting Officer                      Commissioner of Patents